United States Patent
Pack et al.

(10) Patent No.: US 10,985,629 B2
(45) Date of Patent: Apr. 20, 2021

(54) INTEGRATED POWER ELECTRONICS COMPONENT FOR MITIGATING NOISE, VIBRATION, AND HARSHNESS

(71) Applicant: GM Global Technology Operations LLC, Detroit, MI (US)

(72) Inventors: Seongchan Pack, West Bloomfield, MI (US); Su Jung Han, West Bloomfield, MI (US); Martin S. Kramer, Davisburg, MI (US); Song He, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 405 days.

(21) Appl. No.: 16/124,906

(22) Filed: Sep. 7, 2018

(65) Prior Publication Data
US 2020/0083778 A1    Mar. 12, 2020

(51) Int. Cl.
*H02K 5/24* (2006.01)
*H02K 5/06* (2006.01)
*H02K 5/02* (2006.01)

(52) U.S. Cl.
CPC ............... *H02K 5/24* (2013.01); *H02K 5/02* (2013.01); *H02K 5/06* (2013.01)

(58) Field of Classification Search
CPC .. H02K 5/24; H02K 5/06; H02K 5/02; H02K 11/33; H02K 5/08; G10K 11/00; G10K 11/002; G10K 11/16; G10K 11/168; Y02T 10/7072; Y02T 90/14; Y02T 10/70
USPC ........................................................ 310/51, 89
See application file for complete search history.

(56) References Cited

U.S. PATENT DOCUMENTS

| | | | |
|---|---|---|---|
| 2009/0233069 A1* | 9/2009 | Merlette | B60R 13/0884 428/212 |
| 2013/0036611 A1* | 2/2013 | Hanna | B21D 53/88 29/897.2 |
| 2019/0393759 A1* | 12/2019 | Huang | H02K 5/18 |

FOREIGN PATENT DOCUMENTS

EP    2557667 A1 *  2/2013 ............ H02K 11/33

* cited by examiner

*Primary Examiner* — Quyen P Leung
*Assistant Examiner* — Alexander A Singh
(74) *Attorney, Agent, or Firm* — Quinn IP Law

(57) ABSTRACT

An integrated power electronics component configured for mitigating noise, vibration, and harshness includes a case formed from metal and configured to dampen a sound wave having a first frequency and a first amplitude and propagatable in a first direction. The case has a first surface and a second surface spaced apart from the first surface, a first stiffness, and a first strength, and the first and second surfaces include a structure defining a plurality of recessions therein. The component includes a cured polymer formed from a composition disposed on at least one of the first and second surfaces in each of the recessions to thereby dampen the sound wave in the first direction and in a second direction that is perpendicular to the first direction to a second frequency that is less than the first frequency and a second amplitude that is less than the first amplitude.

20 Claims, 3 Drawing Sheets

INTEGRATED POWER ELECTRONICS COMPONENT FOR MITIGATING NOISE, VIBRATION, AND HARSHNESS

INTRODUCTION

The disclosure relates to an integrated power electronics component configured for mitigating noise, vibration, and harshness.

Devices and components often emit noise and vibration during operation, and such noise and vibration may be measured in terms of harshness as experienced by an operator or user. For example, an electric motor may produce noise in the form of an unwanted sound, vibration as an oscillation that is generally felt rather than heard, and/or harshness, i.e., a severity or discomfort associated with the noise or vibration. Over time, such noise, vibration, and harshness may spoil an operating environment and contribute to user fatigue or discomfort.

SUMMARY

An integrated power electronics component configured for mitigating noise, vibration, and harshness includes a case formed from a metal and configured to dampen a sound wave having a first frequency and a first amplitude and propagatable in a first direction. The case has a first surface and a second surface spaced apart from the first surface, a first stiffness, and a first strength. The first surface and the second surface include a structure defining a plurality of recessions therein. The integrated power electronics component further includes a cured polymer formed from a composition disposed on at least one of the first surface and the second surface in each of the plurality of recessions to thereby dampen the sound wave in the first direction and in a second direction that is perpendicular to the first direction to a second frequency that is less than the first frequency and a second amplitude that is less than the first amplitude. The integrated power electronics component has a second stiffness that is greater than the first stiffness and a second strength that is greater than the first strength.

In one aspect, the polymeric component may entirely fill each of the plurality of recessions. Further, the structure may be formed from a plurality of adjoining hexagons each defining a respective one of the plurality of recessions therein.

The composition may include at least one of a metallic component, a fiber component, and a ceramic component.

In another aspect, the integrated power electronics component may further include a second layer disposed on the cured polymer, formed from a metallic composition, and configured for shielding the case from electromagnetic interference. The second layer may encapsulate the cured polymer.

The cured polymer may be disposed along an entirety of the first surface. Alternatively, the cured polymer may be solely disposed along a portion of the first surface.

In another embodiment, the integrated power electronics component includes a case formed from a metal and configured to dampen a sound wave having a first frequency and a first amplitude and propagatable in a first direction. The case has a first surface and a plurality of protrusions extending from the first surface and defining a plurality of interlocking cavities therein. Further, the case has a first stiffness and a first strength. The integrated power electronics component also includes a cured polymer formed from a composition disposed within the plurality of interlocking cavities and configured to dampen the sound wave in the first direction and in a second direction that is perpendicular to the first direction to a second frequency that is less than the first frequency and a second amplitude that is less than the first amplitude. The integrated power electronics component has a second stiffness that is greater than the first stiffness and a second strength that is greater than the first strength.

In one aspect, the polymeric component is insertable into the plurality of interlocking cavities such that the cured polymer fills the plurality of interlocking cavities and the plurality of protrusions surround the cured polymer.

The plurality of protrusions may be disposed along an entirety of the first surface. Alternatively, the plurality of protrusions may be solely disposed along a portion of the first surface.

The polymeric component may include at least one of a metallic component, a fiber component, a ceramic component, and an electromagnetic interference-blocking component.

A device includes a driven component and an electric drive unit configured for driving the driven component. The electric drive unit includes an electric traction motor and an integrated power electronics component attached to the electric traction motor and configured for mitigating noise, vibration, and harshness. The integrated power electronics component includes a case formed from a metal and configured to dampen a sound wave emitted by the electric traction motor, having a first frequency and a first amplitude, and propagatable in a first direction. The case has a first surface and a second surface spaced apart from the first surface, a first stiffness, and a first strength. The first surface and the second surface include a structure defining a plurality of recessions therein. The integrated power electronics component further includes a cured polymer formed from a composition disposed on at least one of the first surface and the second surface in each of the plurality of recessions to thereby dampen the sound wave in the first direction and in a second direction that is perpendicular to the first direction to a second frequency that is less than the first frequency and a second amplitude that is less than the first amplitude. The integrated power electronics component has a second stiffness that is greater than the first stiffness and a second strength that is greater than the first strength.

In one aspect, the composition may entirely fill each of the plurality of recessions. The structure may be formed from a plurality of adjoining hexagons each defining a respective one of a plurality of recessions therein. Further, the composition may include at least one of a metallic component, a fiber component, and a ceramic component.

The integrated power electronics component may further include a second layer disposed on the cured polymer, formed from a metallic composition, and configured for shielding the case from electromagnetic interference. The second layer may encapsulate the cured polymer.

In another aspect, the electric traction motor may have a central longitudinal axis and the first surface and the second surface may each be planar and parallel to one another and to the central longitudinal axis.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
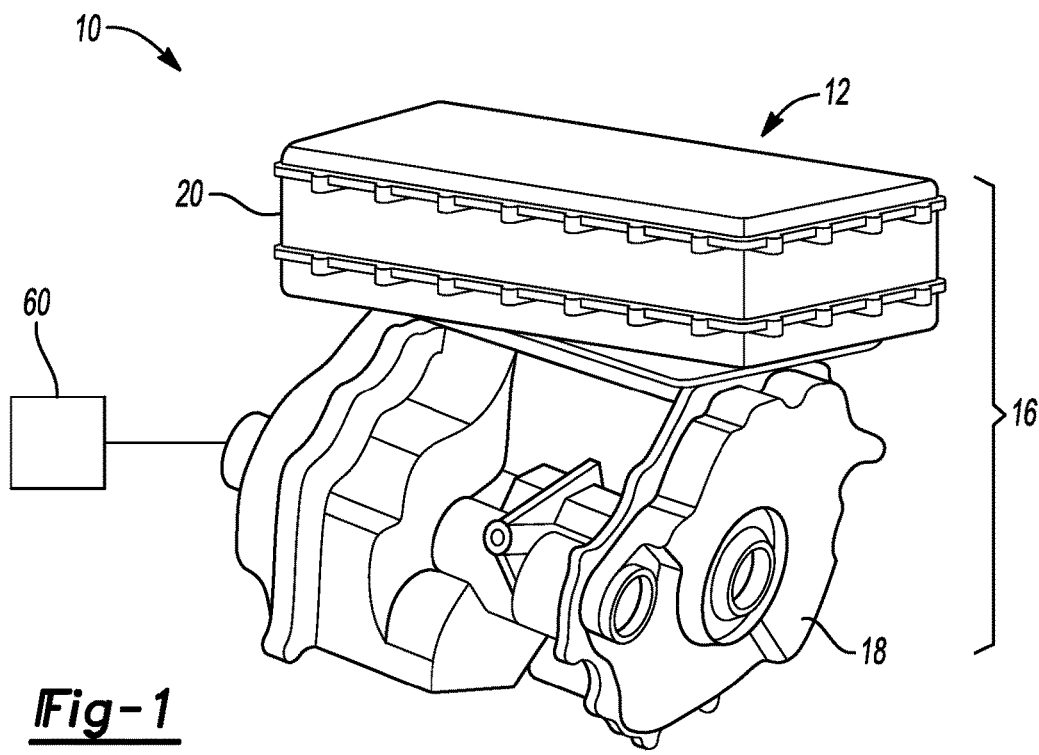
FIG. 1 is a schematic illustration of a perspective view of a device including an integrated power electronics component attached to an electric traction motor.

Referring to the Figures, wherein like reference numerals refer to like elements, a device 10 including an integrated power electronics component 12 configured for mitigating noise, vibration, and harshness is shown generally in FIG. 1. The device 10 and integrated power electronics component 12 may be useful for applications requiring excellent efficiency and minimal noise, vibration, and harshness during operation. As used herein, the terminology noise refers to an unwanted sound; the terminology vibration refers to an oscillation that is generally felt rather than heard; and the terminology harshness refers to a severity or discomfort associated with the noise or vibration, especially for comparatively short-duration events. In particular, the integrated power electronics component 12 may dampen a sound wave 14 (FIG. 3) during operation so as to mitigate noise, vibration, and harshness, yet may have excellent stiffness, strength, and mechanical properties. That is, the integrated power electronics component 12 may efficiently and effectively dissipate sound energy, but may also be suitable for applications requiring excellent stiffness, strength, and toughness and protection from electromagnetic interference. Further, the integrated power electronics component 12 may be economical to manufacture, may be scalable to mass production manufacturing operations, may improve an operating environment, and may delay user fatigue.

As such, the device 10 and integrated power electronics component 12 may be useful for vehicular applications such as, but not limited to, automobiles, buses, forklifts, motorcycles, bicycles, trains, trams, trolleys, spacecraft, airplanes, farming equipment, earthmoving or construction equipment, cranes, tanks and transporters, boats, and the like. For example, the device 10 may be a vehicle and the integrated power electronics component 12 may be a component of an electric drive unit 16 for non-autonomous, autonomous, or semi-autonomous vehicle applications. Alternatively, the device 10 and integrated power electronics component 12 may be useful for non-vehicular applications such as stationary power generation, residential appliances, portable power generation, electronics, computers, tools, and the like.

More specifically, as described with reference to FIG. 1, the integrated power electronics component 12 may manage a flow of electrical energy delivered by a battery (not shown) or other power source and may control a speed and produced torque of an electric traction motor 18. The integrated power electronics component 12 includes a case 20 formed from a metal and configured to dampen the sound wave 14. The case 20 may be configured for enclosing and protecting electrical and electronics equipment such as, but not limited to, power distributors, controllers, discharge resistors, electromagnetic interference filters, switches, inverters, and the like. In particular, the case 20 may be formed from a metal to protect the electrical and electronics equipment from internal and external radio frequencies.

Figure 3:
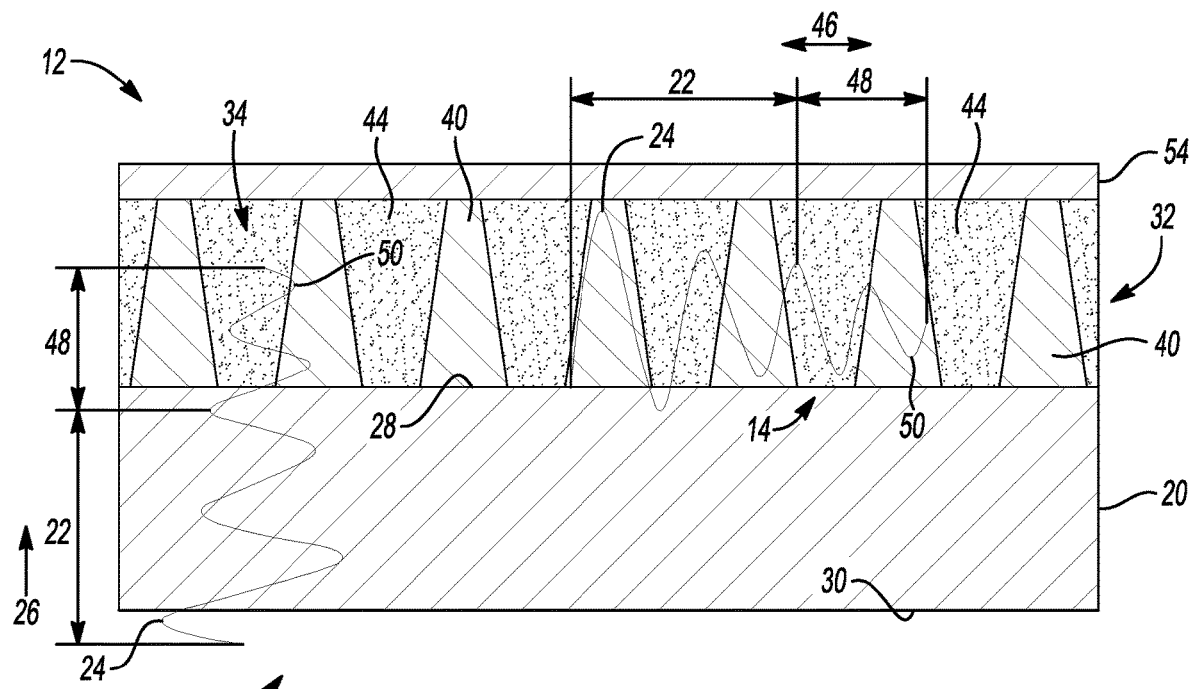
FIG. 3 is a schematic illustration of a cross-sectional view of a cured polymer disposed within a plurality of recessions defined by a structure of the case of FIG. 2 taken along section lines 3-3.

As best shown in FIG. 3, the sound wave 14 has a first frequency 22 and a first amplitude 24 and is propagatable in a first direction 26. Further, the case 20 may have a first surface 28 and a second surface 30 spaced apart from the first surface 28, a first stiffness, and a first strength, and may be formed from, for example, aluminum.

More specifically, the first surface 28 and the second surface 30 may include a structure 32 defining a plurality of recessions 34 therein. In one example described with reference to FIG. 2, the structure 32 may be formed from a plurality of adjoining hexagons 36 each defining a respective one of the plurality of recessions 34 therein. That is, the structure 32 may be configured as a honeycomb 38. Each of the plurality of hexagons 36 may adjoin adjacent ones of the plurality of hexagons 36 to form the honeycomb 38 illustrated generally in FIG. 2. By way of non-limiting examples, each side of the plurality of hexagons 36 may be formed as a wedge 40 having a top width of from 20 microns to 50 microns, e.g., from 30 microns to 40 microns; a height of from 150 microns to 170 microns, e.g., from 155 microns to 165 microns; and a base width of from 40 microns to 80 microns, e.g., from 55 microns to 65 microns.

Although not shown, in another aspect, the structure may further include a plurality of retainers each configured to stabilize the honeycomb 38 such that one of the plurality of retainers is disposed within a respective recession 34 defined by each of the plurality of hexagons 36 and protrudes from the case 20. That is, the plurality of retainers may prevent or minimize collapse of the honeycomb 38 and provide extra interference as the sound wave 14 propagates through the integrated power electronics component 12. Each of the plurality of retainers may have a width of from 100 microns to 120 microns, e.g., from 105 microns to 115 microns, and a height of from 20 microns to 30 microns, e.g., from 23 microns to 27 microns.

In another non-limiting example, although not shown, the structure 32 may be configured as a wedge field and may include a plurality of adjoining wedges that do not form the plurality of hexagons 36. More specifically, four of the plurality of adjoining wedges may form a rectangle defining one of the plurality of recessions 34 therebetween. Each of the plurality of adjoining wedges may have a top width of from 40 microns to 60 microns, e.g., from 45 microns to 55 microns; a height of from 100 microns to 120 microns, e.g., from 105 microns to 115 microns; a base width of from 80 microns to 120 microns, e.g., from 90 microns to 110 microns; and a length of from 400 microns to 600 microns, e.g., 450 microns to 550 microns.

In another non-limiting example, although not shown, the structure 32 may be configured as an embossed field and may include a plurality of cones extending from the first surface 28 and second surface 30 and defining the plurality of recessions 34 therebetween. In particular, each of the plurality of cones may have a circular base having a diameter of from 50 microns to 80 microns, e.g., from 60 microns to 70 microns, and a height of from 100 microns to 120 microns, e.g., from 105 microns to 115 microns.

The integrated power electronics component 12 also includes a cured polymer 44 formed from a composition and disposed on at least one of the first surface 28 and the second surface 30 in each of the plurality of recessions 34 to dampen the sound wave 14 in the first direction 26 and in a second direction 46 that is perpendicular to the first direction 26 to a second frequency 48 that is less than the first frequency 22 and a second amplitude 50 that is less than the first amplitude 24. Further, the integrated power electronics component 12 has a second stiffness that is greater than the first stiffness and a second strength that is greater than the first strength. That is, the cured polymer 44 may enhance the sound dampening capabilities of the case 20 and may increase the stiffness and strength of the case 20 such that the integrated power electronics component 12 may have excellent noise, vibration, and harshness dampening and suitable stiffness and strength for comparatively high-torque operating conditions, as set forth in more detail below. For each of the embodiments and configurations of the structure 32 set forth above, at values above or below the aforementioned ranges, the cured polymer 44 may not sufficiently dissipate the sound wave 14 and/or may not sufficiently enhance the stiffness, strength, and/or toughness of the case 20.

In particular, as described with reference to FIG. 3, the composition may entirely fill each of the plurality of recessions 34. That is, the composition may be insertable into the plurality of recessions 34 such that the plurality of recessions 34 abut and surround the cured polymer 44.

Figure 2:
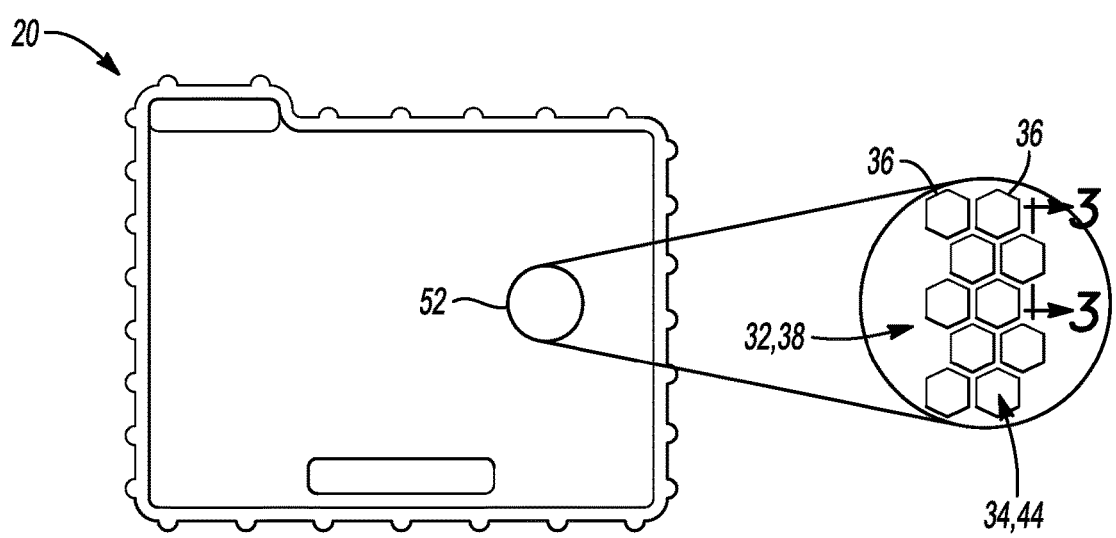
FIG. 2 is a schematic illustration of a perspective and exploded top view of a case of the integrated power electronics component of FIG. 1.

Further, the cured polymer 44 may be disposed solely along a portion 52 of the first surface 28, i.e., within the plurality of recessions 34 along a part of the first surface 28 and/or second surface 30, as illustrated in FIG. 2. That is, placement of the cured polymer 44 may be tuned or selected or optimized to correspond to areas of potentially strong noise, vibration, and harshness during operation. Alternatively, although not shown, the cured polymer 44 may be disposed along an entirety of the first surface 28, i.e., within the plurality of recessions 34 along the entirety of the first surface 28 and/or second surface 30.

For this embodiment of the integrated power electronics component 12, the composition may include at least one of a metallic component, a fiber component, and a ceramic component. For example, the cured polymer 44 may be formed from at least one of a metallic composite powder and a polymer/fiber-filled corded wire. That is, the composition may include a polymeric base component and at least one additional component as a filler or modifier. In one specific example, the cured polymer 44 may be formed from the metallic composite powder cradled within a plurality of woven layers without breaking the plurality of woven layers. That is, the cured polymer 44 may include a maintained woven layer structure.

Referring again to FIG. 3, the integrated power electronics component 12 may also include a second layer 54 disposed on the cured polymer 44, formed from a metallic composition, and configured for shielding the case 20 from electromagnetic interference. For example, the metallic composition may include zinc and/or copper and may be configured for disrupting electromagnetic radiation propagation through the case 20. That is, since the integrated power electronics component 12 may house electronic equipment as set forth above, the second layer 54 may be configured to shield the case 20 from electromagnetic interference that may disrupt or alter a function of the electronic equipment. As such, the second layer 54 may be characterized as a top coat and may encapsulate the cured polymer 44 as shown in FIG. 3.

Figure 4:
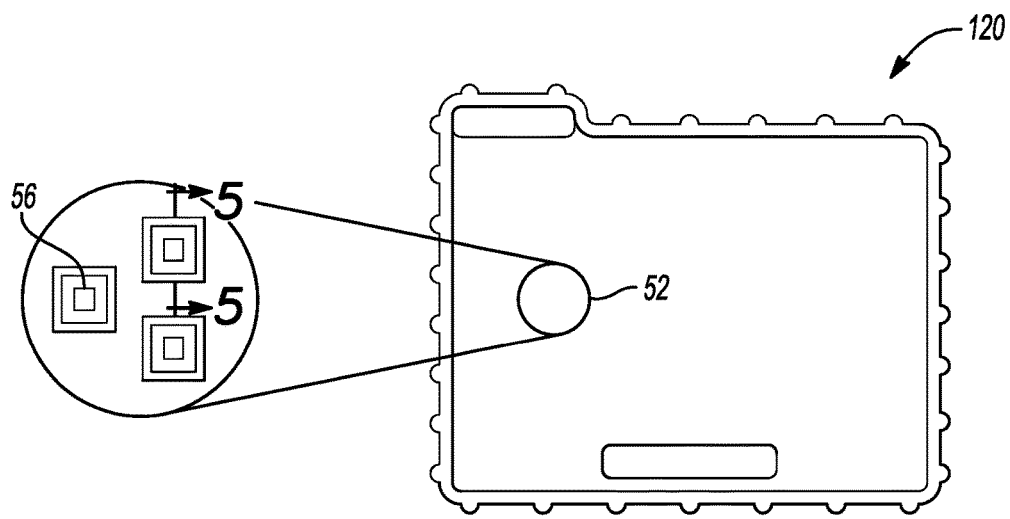
FIG. 4 is a schematic illustration of a perspective and exploded top view of another embodiment of the case of FIG. 2.
Figure 5:
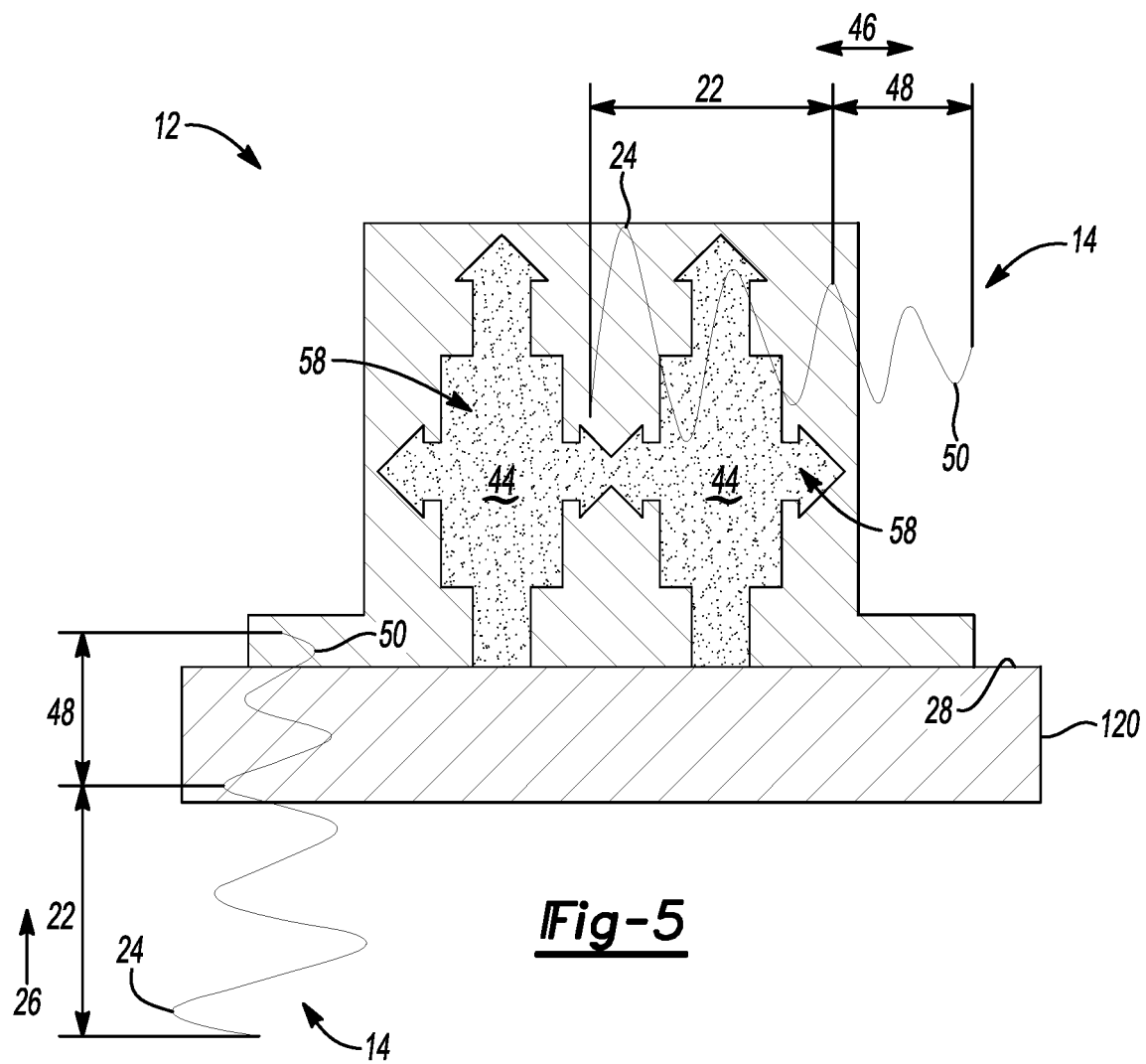
FIG. 5 is a schematic illustration of a cross-sectional view of another embodiment of the case of FIG. 4 taken along section lines 5-5.

Referring now to FIGS. 4 and 5, in another embodiment, the case 120 of the integrated power electronics component 12 has a plurality of protrusions 56 extending from the first surface 28 and defining a plurality of interlocking cavities 58 therein. That is, the plurality of protrusions 56 may be disposed adjacent to one another, and the plurality of interlocking cavities 58 may extend between adjacent ones of the plurality of protrusions 56, i.e., beyond a boundary of one protrusion 56. Alternatively, although not shown, each of the plurality of protrusions 56 may define two or more interlocking cavities 58 therein. That is, each of the interlocking cavities 58 may interlock with adjacent ones of the plurality of interlocking cavities 58 within a single protrusion 56.

For this embodiment, the cured polymer 44 is disposed within the plurality of interlocking cavities 58 and is configured to dampen the sound wave 14 in the first direction 26 and the second direction 46 to the second frequency 48 and the second amplitude 50 as set forth above. That is, the composition may be insertable into the plurality of interlocking cavities 58 such that the cured polymer 44 fills the plurality of interlocking cavities 58 and the plurality of protrusions 56 surround the cured polymer 44.

Further, the plurality of protrusions 56 may be disposed solely along a portion 52 of the first surface 28. That is, the cured polymer 44 may be disposed within the plurality of protrusions 56 along a part of the first surface 28 and/or second surface 30, as illustrated in FIG. 4. That is, placement of the cured polymer 44 and plurality of protrusions 56 may be tuned or selected or optimized to correspond to areas of potentially strong noise, vibration, and harshness during operation. Alternatively, although not shown, the plurality of protrusions 56 may be disposed along an entirety of the first surface 28 such that the cured polymer 44 is disposed within the plurality of protrusions 56 along the entirety of the first surface 28 and/or second surface 30.

For this embodiment of the integrated power electronics component 12, the composition may include at least one of a metallic component, a fiber component, a ceramic component, and an electromagnetic interference-blocking component. For example, the cured polymer 44 may be formed from at least one of a metallic composite powder and a polymer/fiber-filled cored metal wire. Alternatively or additionally, the composition may include copper or zinc as the electromagnetic interference-blocking component so that the cured polymer 44 disposed within the plurality of interlocking cavities 58 may disrupt electromagnetic radiation propagation through the case 20. That is, since the integrated power electronics component 12 may house electronic equipment as set forth above, the cured polymer 44 may be configured to shield the case 20 from electromagnetic interference that may disrupt or alter a function of the electronic equipment.

Referring again to FIG. 1, the device 10 includes a driven component 60 and the electric drive unit 16 configured for driving the driven component 60. That is, the electric drive unit 16 may provide power to the driven component 60. For example, for vehicular applications, the driven component 60 may be a driveshaft, a transmission linkage, or a plurality of wheels. The electric drive unit 16 includes the electric traction motor 18 and the integrated power electronics component 12 attached to the electric traction motor 18. The integrated power electronics component 12 may control the torque produced by the electric traction motor 18 to drive the driven component 60.

Further, during operation of the electric drive unit 16, the sound wave 14 is emitted by the electric traction motor 18 and the cured polymer 44 disposed on or within the case 20 of the integrated power electronics component 12 dampens the sound wave 14. That is, any coupled vibration that is transmitted from the electric traction motor 18 to the integrated power electronics component 12 during operation may be quieted or dampened. Therefore, the electric drive unit 16 may operate efficiently with minimal noise, vibration, and harshness. That is, the cured polymer 44 having the aforementioned characteristics and values may dampen the sound wave 14 in the first direction 26 and the second direction 46 to the second frequency 48 and the second amplitude 50 so as to provide the integrated power electronics component 12 with excellent second stiffness, increased strength as compared to the first strength of the case, and effective dissipation of noise, vibration, and harshness.

A method of forming the integrated power electronics component 12 includes depositing the composition onto the case 20, e.g., into the plurality of recessions 34 or within the plurality of interlocking cavities 58. In one embodiment, depositing may include additively disposing the polymer composition onto the case 20 layer-by-layer. For example, depositing may include stacking the composition into the plurality of recessions 34. Additionally or alternatively, depositing may include sequentially adding the composition into or within the case 20 via additive manufacturing or 3D printing. Further, depositing may include directly injecting the composition into each of the plurality of recessions 34 or plurality of interlocking cavities 58.

The method also includes curing the composition to form the cured polymer 44 disposed in the plurality of recessions 34 or within the plurality of interlocking cavities 58, as set forth above. Curing may include, for example, injection molding, spraying, baking, exposing the composition to ultraviolet radiation, heating, drying, air cooling, and combinations thereof, and may form the cured polymer 44 arranged to disrupt and dissipate the sound wave 14.

Therefore, the integrated power electronics component 12 and device 10 may be useful for applications requiring excellent efficiency, comparatively high stiffness, and minimal noise, vibration, and harshness during operation. In particular, the integrated power electronics component 12 may dampen the sound wave 14 during operation so as to mitigate noise, vibration, and harshness, and may have excellent stiffness, strength, and mechanical properties. That is, the integrated power electronics component 12 may efficiently and effectively dissipate sound energy, but may also be suitable for applications requiring excellent stiffness, strength, and toughness. Further, the integrated power electronics component 12 may be economical to manufacture, may be scalable to mass production manufacturing operations, may improve an operating environment, and may delay user fatigue.

While the best modes for carrying out the disclosure have been described in detail, those familiar with the art to which this disclosure relates will recognize various alternative designs and embodiments for practicing the disclosure within the scope of the appended claims.

What is claimed is:

1. An integrated power electronics component configured for mitigating noise, vibration, and harshness, the integrated power electronics component comprising:
   a case formed from a metal and configured to dampen a sound wave having a first frequency and a first amplitude and propagatable in a first direction;
   wherein the case has:
      a first surface and a second surface spaced apart from the first surface;
      a first stiffness; and
      a first strength;
      wherein the first surface and the second surface include a structure defining a plurality of recessions therein; and
   a cured polymer formed from a composition disposed on at least one of the first surface and the second surface in each of the plurality of recessions to thereby dampen the sound wave in the first direction and in a second direction that is perpendicular to the first direction to a second frequency that is less than the first frequency and a second amplitude that is less than the first amplitude;
   wherein the integrated power electronics component has a second stiffness that is greater than the first stiffness and a second strength that is greater than the first strength.

2. The integrated power electronics component of claim 1, wherein the composition entirely fills each of the plurality of recessions.

3. The integrated power electronics component of claim 1, wherein the structure is formed from a plurality of adjoining hexagons each defining a respective one of the plurality of recessions therein.

4. The integrated power electronics component of claim 1, wherein the composition includes at least one of a metallic component, a fiber component, and a ceramic component.

5. The integrated power electronics component of claim 1, further including a second layer disposed on the cured polymer, formed from a metallic composition, and configured for shielding the case from electromagnetic interference.

6. The integrated power electronics component of claim 5, wherein the second layer encapsulates the cured polymer.

7. The integrated power electronics component of claim 1, wherein the cured polymer is disposed along an entirety of the first surface.

8. The integrated power electronics component of claim 1, wherein the cured polymer is solely disposed along a portion of the first surface.

9. An integrated power electronics component configured for mitigating noise, vibration, and harshness, the integrated power electronics component comprising:
   a case formed from a metal and configured to dampen a sound wave having a first frequency and a first amplitude and propagatable in a first direction;
   wherein the case has a first surface and a plurality of protrusions extending from the first surface and defining a plurality of interlocking cavities therein;
   wherein the case has a first stiffness and a first strength; and
   a cured polymer formed from a composition disposed within the plurality of interlocking cavities and configured to dampen the sound wave in the first direction and in a second direction that is perpendicular to the first direction to a second frequency that is less than the first frequency and a second amplitude that is less than the first amplitude;
   wherein the integrated power electronics component has a second stiffness that is greater than the first stiffness and a second strength that is greater than the first strength.

10. The integrated power electronics component of claim 9, wherein composition is insertable into the plurality of interlocking cavities such that the cured polymer fills the plurality of interlocking cavities and the plurality of protrusions surround the cured polymer.

11. The integrated power electronics component of claim 9, wherein the plurality of protrusions are disposed along an entirety of the first surface.

12. The integrated power electronics component of claim 9, wherein the plurality of protrusions are solely disposed along a portion of the first surface.

13. A device comprising:
   a driven component;

an electric drive unit configured for driving the driven component and including:
an electric traction motor; and
an integrated power electronics component attached to the electric traction motor and configured for mitigating noise, vibration, and harshness, the integrated power electronics component comprising:
  a case formed from a metal and configured to dampen a sound wave emitted by the electric traction motor, having a first frequency and a first amplitude, and propagatable in a first direction;
  wherein the case has:
    a first surface and a second surface spaced apart from the first surface;
    a first stiffness; and
    a first strength;
    wherein the first surface and the second surface include a structure defining a plurality of recessions therein; and
  a cured polymer formed from a composition disposed on at least one of the first surface and the second surface in each of the plurality of recessions to thereby dampen the sound wave in the first direction and in a second direction that is perpendicular to the first direction to a second frequency that is less than the first frequency and a second amplitude that is less than the first amplitude;
  wherein the integrated power electronics component has a second stiffness that is greater than the first stiffness and a second strength that is greater than the first strength.

14. The integrated power electronics component of claim 13, wherein the composition includes at least one of a metallic component, a fiber component, a ceramic component, and an electromagnetic interference-blocking component.

15. The device of claim 13, wherein the composition entirely fills each of the plurality of recessions.

16. The device of claim 13, wherein the structure is formed from a plurality of adjoining hexagons each defining a respective one of the plurality of recessions therein.

17. The device of claim 13, wherein the composition includes at least one of a metallic component, a fiber component, and a ceramic component.

18. The device of claim 13, wherein the integrated power electronics component further includes a second layer disposed on the cured polymer, formed from a metallic composition, and configured for shielding the case from electromagnetic interference.

19. The device of claim 18, wherein the second layer encapsulates the cured polymer.

20. The device of claim 13, wherein the electric traction motor has a central longitudinal axis, and further wherein the first surface and the second surface are each planar and parallel to one another and to the central longitudinal axis.

* * * * *